J. D. WALKER.
Fire-Kindler.
No. 210,582.  Patented Dec. 3, 1878.
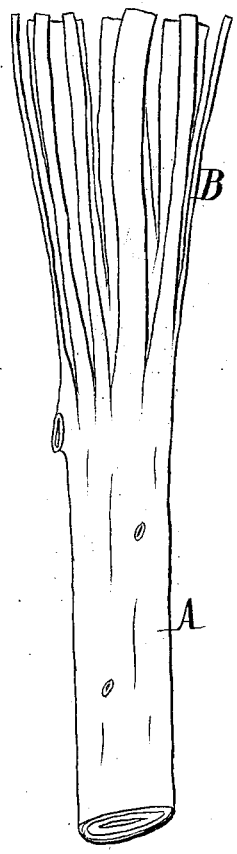
Witnesses.
Chas. Wahlers.
W. C. Hauff
Inventor.
John D. Walker
by his attys.
Van Santvoord & Hauff

UNITED STATES PATENT OFFICE.

JOHN D. WALKER, OF STAMFORD, CONNECTICUT; SAMUEL ROBERTS (ADMINISTRATOR OF SAID WALKER, DECEASED) ASSIGNOR TO JOHN F. MATHEWS, OF SAME PLACE.

IMPROVEMENT IN FIRE-KINDLERS.

Specification forming part of Letters Patent No. 210,582, dated December 3, 1878; application filed July 10, 1878.

*To all whom it may concern:*

Be it known that I, JOHN D. WALKER, of Stamford, in the county of Fairfield and State of Connecticut, have invented a new and useful Improvement in Fire-Kindlers, which improvement is fully set forth in the following specification, reference being had to the accompanying drawing, which represents a side view of a kindler prepared according to my invention.

The aim of my invention is to furnish a fire-kindler which can be readily ignited, and at the same time has sufficient body to be used in building a coal-fire without the addition of wood fuel, besides being cheaper than the kindlers now generally in use.

It consists in a fire-kindler prepared from a stick of wood by crushing the same through a portion of its length, and then drying the same, a portion of the stick being left solid, as hereinafter fully set forth.

In carrying out my invention, I take a branch of a tree of any sort or species, and cut the same into sticks of proper length; then pound each of these sticks, either by hand or machinery, through a portion of its length, as at B, so as to crush that portion of the stick, and finally dry the stick in any suitable manner.

It will be perceived that the crushed part B of the stick is adapted to be ignited by holding the same in a flame for a few seconds, while the solid part thereof, marked A, besides serving to bind or hold the crushed part together, forms a substantial article of fuel.

A green branch is available for my purpose, by reason of the fact that when the sticks are crushed the interior thereof is laid bare, and they can be dried without loss of time, whereas by preparing the sticks in a green state the least pressure is required for crushing the same, and they are least liable to become broken by the action of the crushing-instrument.

For the purpose of drying the sticks after they are crushed, I place the same in an oven; but they can also be dried in the atmosphere.

The woods which can be used to the greatest advantage in the preparation of my kindlers are hickory, ash, oak, apple-tree, and maple; but I do not wish to limit myself to the use of any particular sort or species.

What I claim as new, and desire to secure by Letters Patent, is—

A fire-kindler consisting of a stick of wood which is crushed through a portion of its length, and then dried, substantially in the manner hereinbefore set forth.

In testimony that I claim the foregoing I have hereunto set my hand and seal this 6th day of July, 1878.

JOHN D. WALKER. [L. S.]

Witnesses:
    F. RHODES,
    W. FERRIS WATERBURY.